United States Patent [19]
Hitchcock

[11] Patent Number: 5,562,081
[45] Date of Patent: Oct. 8, 1996

[54] ELECTRICALLY-CONTROLLED THROTTLE WITH VARIABLE-RATIO DRIVE

[75] Inventor: Ralph L. Hitchcock, Winsted, Conn.

[73] Assignee: Philips Electronics North America Corporation, New York, N.Y.

[21] Appl. No.: 527,243

[22] Filed: Sep. 12, 1995

[51] Int. Cl.⁶ .................................................. F02D 7/00
[52] U.S. Cl. ............................................................ 123/399
[58] Field of Search .................................. 123/399, 361, 123/325, 397, 396; 180/197

[56] References Cited

U.S. PATENT DOCUMENTS

| | | | |
|---|---|---|---|
| 4,724,811 | 2/1988 | Maisch | 123/361 |
| 4,735,183 | 4/1988 | Inoue et al. | 123/399 |
| 5,016,588 | 5/1991 | Pagdin et al. | 123/399 |
| 5,146,886 | 9/1992 | Mannle et al. | 123/325 |
| 5,150,679 | 9/1992 | Peter | 123/397 |
| 5,168,951 | 12/1992 | Sugiura et al. | 180/197 |
| 5,263,448 | 11/1993 | Bluhm et al. | 123/396 |
| 5,301,646 | 4/1994 | Doi et al. | 123/399 |
| 5,307,777 | 5/1994 | Sasajima et al. | 123/399 |
| 5,323,747 | 6/1994 | Buchl Josef | 123/399 |

FOREIGN PATENT DOCUMENTS

| | | |
|---|---|---|
| 0482284 | 4/1992 | European Pat. Off. . |
| 9210663 | 6/1992 | WIPO . |
| 9210664 | 6/1992 | WIPO . |
| 9400858 | 1/1994 | WIPO . |

*Primary Examiner*—Raymond A. Nelli
*Attorney, Agent, or Firm*—Robert J. Kraus

[57] ABSTRACT

An engine throttle is controllably positioned by an electric motor which is coupled to the throttle through engaged, first and second, variable-radius scroll gears. The motor works against the force of a throttle return spring, and this force increases as the throttle is driven away from a fail-safe position. By choosing the variation of the ratio of the scroll gear radii to match the variation of the force developed by the spring with throttle position, a constant driving torque produced by the motor will overcome the increasing torque produced by the spring.

19 Claims, 5 Drawing Sheets

ELECTRICALLY-CONTROLLED THROTTLE WITH VARIABLE-RATIO DRIVE

BACKGROUND OF THE INVENTION

1. Field of the Invention

This invention relates to a throttle control apparatus for an engine and, in particular, to such an apparatus having a fail-safe feature.

2. Description of Related Art

In state-of-the-art vehicles it is becoming common practice to control engine throttles electrically rather than by mechanical linkages. For example, an automotive vehicle having a traction-control system will typically include an electrically-controlled auxiliary throttle for reducing engine power whenever drive-wheel slippage is experienced. As another example, a vehicle having a drive-by-wire capability will typically include an electrically-controlled primary throttle for controlling engine power in response to a signal from engine-control electronics.

For any engine having an electrically-controlled throttle system it is desirable to have a safety mechanism for moving the throttle to a fail-safe position in the event that electrical power to the system is lost. Such safety mechanisms typically include respective springs for returning the primary throttle to a minimum engine-power position and for returning the auxiliary throttle to a minimum power-reduction position.

In FIG. 1, the solid line illustrates the force developed by an exemplary spring utilized for returning a throttle to its fail-safe position. In this example, the spring is a rotary spring, such as a torsion spring, disposed around a rotatable throttle shaft, and having distal ends attached to the shaft and to a fixed member (such as a throttle body), respectively. The spring force is plotted as a function of angular position of the throttle and is expressed as a torque for this rotary example. Throttle position $\theta_f$ corresponds to a fail-safe position while throttle position $\theta_m$ corresponds to a maximum operating position. In the example of a primary throttle, $\theta_f$ corresponds to a minimum engine-power position (e.g. throttle substantially closed), while $\theta_m$ corresponds to a maximum engine-power position (e.g. throttle fully open). Conversely, in the example of an auxiliary throttle for traction control, $\theta_f$ corresponds to a minimum power-reduction position (e.g. throttle fully open), while $\theta_m$ corresponds to a maximum power-reduction position (e.g. throttle substantially closed).

Note that the spring force increases steadily from a value $L_f$ to a value $L_m$ as the throttle is driven from the fail-safe position $\theta_f$ to the maximum operating position $\theta_m$. Drive means for positioning the throttle must therefore be capable of producing a torque, at the throttle shaft, which is at least equal to the torque $L_m$. This corresponds to the maximum operative counteracting torque exerted by the spring attached to the throttle shaft. Typically this driving force is produced by an electric motor which is connected to the throttle shaft through force-multiplying means, such as gearing, to provide a mechanical advantage. This reduces the size and power requirements for the motor. Unfortunately, however, it also reduces the spring advantage in acting against the motor (in a lost-power situation) to return the throttle to the fail-safe position. In such a situation, the spring must overcome frictional forces and any counteracting permanent magnet forces existing within the motor. Further, by providing such a mechanical advantage to the motor, the operating speed requirement of the motor is increased. Not only does this increase the cost of the motor, but in some types of motors the torque output of the motor actually decreases with increasing speed. Thus there is a limit to the mechanical advantage that can be provided.

SUMMARY OF THE INVENTION

It is an object of the invention to provide a throttle control apparatus in which the required torque output of a drive means is reduced without increasing its speed requirement.

In accordance with the invention, a throttle control apparatus includes a throttle member, rotatable about a first axis between fail-safe and maximum operating positions, for effecting respective first and second power outputs from the engine. A spring means is operatively connected to the throttle member to force it toward the fail-safe position. An electrically-controllable drive means, having a motive shaft which is rotatable about a second axis, is provided for effecting movement of the throttle member in response to a control signal. A variable torque ratio means couples the motive shaft to the throttle member. This means effects an increasing ratio of return torque exerted by the spring means to return torque transferred thereby to the motive shaft, as the throttle member moves from the fail-safe position $\theta_f$ to the maximum operating position $\theta_m$.

FIG. 2 illustrates the result of coupling a throttle member to a motive shaft via a variable torque ratio means in accordance with the invention. The dashed line represents the same spring return force as in FIG. 1. However, the variable torque ratio means effects a decrease in the torque transferred from the spring return means to the motive shaft, as the throttle member moves from the fail-safe position $\theta_f$ to the maximum operating position $\theta_m$. Conversely, it effects an increase in the torque transferred from the spring return means to the motive shaft, as the throttle member moves from the maximum operating position $\theta_m$ to the fail-safe position Thus, the return force applied to the motive shaft for throttle positions in the vicinity of the maximum operating position $\theta_m$ will be smaller than that represented by the dashed line, while the return force applied to the motive shaft for throttle positions in the vicinity of the fail-safe position $\theta_f$ will be larger than that represented by the dashed line. This applied force, which always has a torque between $L_m$ and $L_f$, is illustrated by the solid line in FIG. 2 for a particularly advantageous embodiment of the invention. In this embodiment, the applied force has a torque $L_i$ which is substantially lower than $L_m$ and is constant throughout the entire range of operational throttle positions. This minimizes the torque required for the motor to operate at a chosen speed.

DESCRIPTION OF THE PREFERRED EMBODIMENTS

Figure 3:
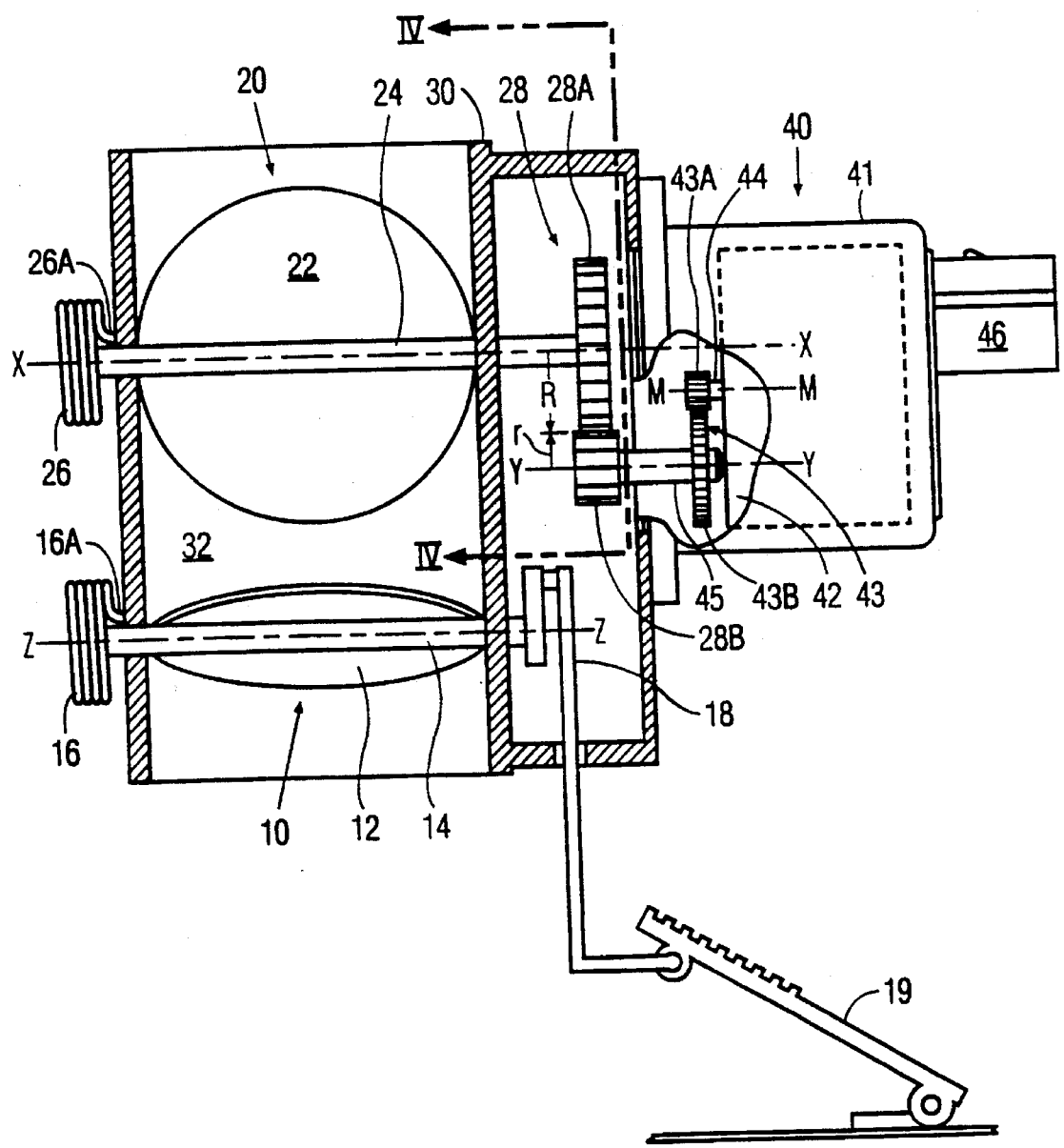
FIG. 3 is a front view, partly in cross section, of a first embodiment of a throttle control apparatus in accordance with the invention.

FIG. 3 illustrates a first embodiment of a throttle control apparatus in accordance with the invention. The apparatus comprises a primary throttle 10 and an auxiliary throttle 20, each including a respective throttle plate which is rotatably mounted in a throttle body 30 (shown in cross section). In this exemplary embodiment, the auxiliary throttle operates as part of a traction control system.

The primary throttle plate 12 is arranged and operated conventionally and is affixed to a primary shaft 14 which is rotatable about an axis Z—Z. A first torsion spring 16 is disposed at one end of the primary shaft 14 and has one end 16A attached to the throttle body and an opposite, internal end (not visible) attached to the shaft. The opposite end of the primary shaft is coupled through a rotary-to-linear linkage 18 to an accelerator pedal 19. The accelerator pedal is operated against the force of the first torsion spring 16, which biases the primary throttle plate 12 toward the substantially closed fail-safe position, which is shown in the figure, and at which the engine produces minimum power. Typically this position is a few degrees away from perpendicular to the throttle body inner wall 32 to prevent the throttle plate from binding against the wall.

The auxiliary throttle plate 22 is arranged and operated in accordance with the invention and is affixed to an auxiliary shaft 24 which is rotatable about an axis X—X. A second torsion spring 26 is disposed at one end of the auxiliary shaft 24 and also has one end 26A attached to the throttle body and an opposite, internal end (not visible) attached to the shaft. The opposite end of the auxiliary shaft is coupled through a variable-torque-ratio arrangement 28 to a driving shaft 45 of an electrically controllable drive apparatus 40. The second torsion spring 26 biases the auxiliary throttle plate 22 toward a fully open fail-safe position, (the position shown in FIG. 3) at which this throttle has a minimum-power-reducing effect on the engine.

In the exemplary embodiment shown in FIG. 3, the drive apparatus 40 comprises a housing 41 containing an electric stepper motor 42, a gear train 43 coupling a rotatable shaft 44 of the motor to the driving shaft 45, and an electrical connector 46 (integrally molded with the housing) for electrically connecting the motor 42 to engine control electronics (not shown). Typical stepper motors which are well suited for use in such a drive apparatus are, for example, series 4SHG and L82800 stepper motors available from Philips Technologies in Cheshire, Conn.

Figure 1:
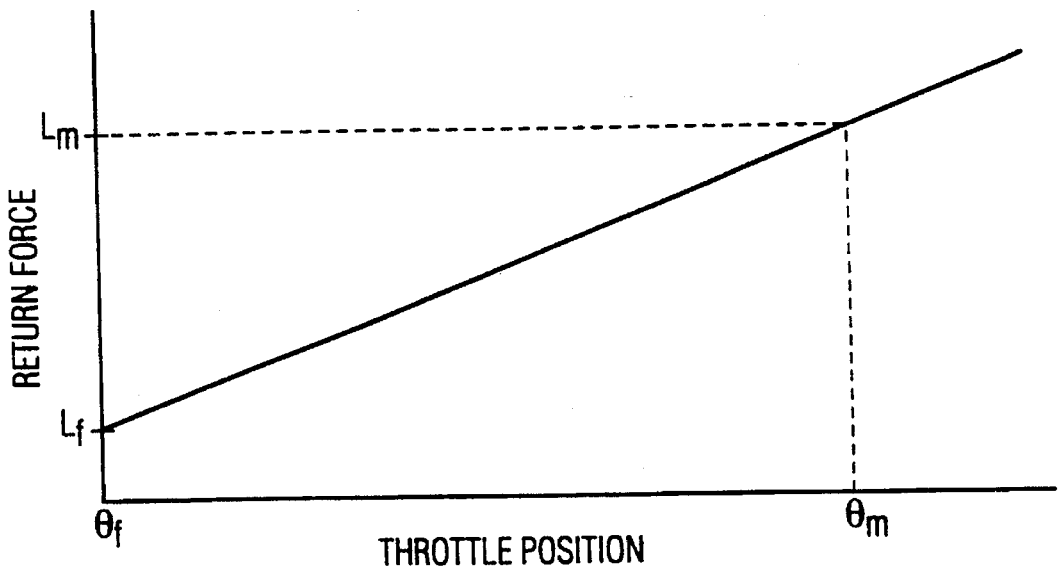
FIG. 1 is a graph representing an exemplary return force versus throttle position characteristic of a prior art throttle control apparatus.
Figure 2:
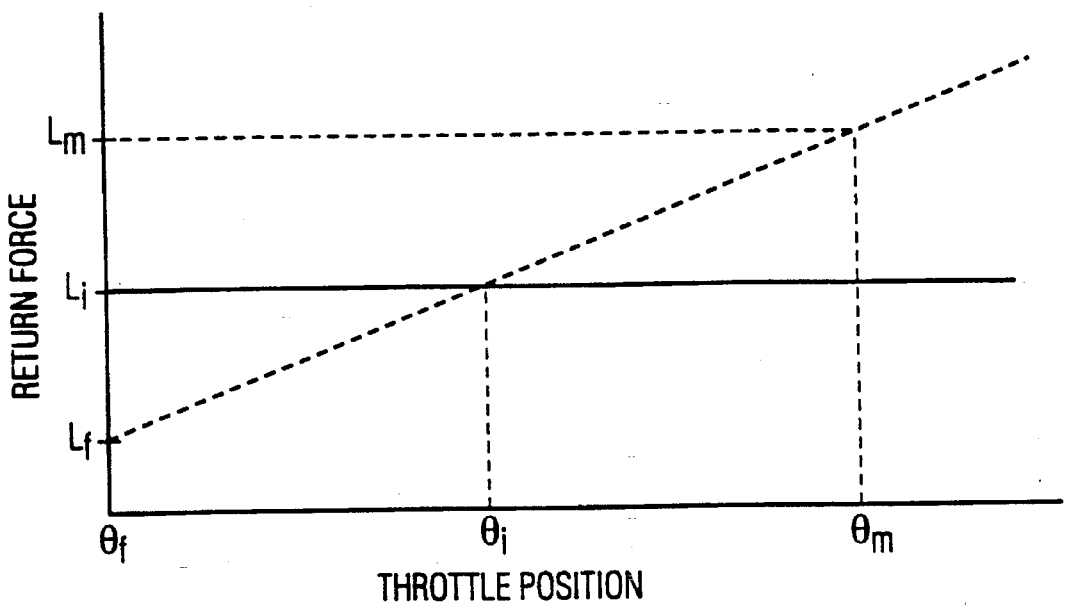
FIG. 2 is a graph representing an exemplary return force versus throttle position characteristic of a throttle control apparatus in accordance with the invention.

The gear train 43 includes a pinion gear 43A which is attached to the shaft 44 of the motor for rotation about a motor axis M—M. The pinion gear 43A engages a larger-radius gear 43B which is attached to the driving shaft 45 for rotation about an axis Y—Y along with the driving shaft. The ratio of the radii of the pinion gear and the larger-radius gear are chosen to apply to the shaft 45 at least the torque $L_i$ (See FIG. 2.) at the operating speed of the motor. The rotary position of the motor shaft 44, and ultimately that of the auxiliary shaft 24 and affixed auxiliary throttle plate 22, are controlled by electrical pulses applied to windings of the motor 42, via the electrical connector 46, by the engine control electronics.

The variable-torque-ratio arrangement 28 comprises first and second, mutually-engaged, variable-radius members 28A and 28B, which are arranged for rotation about respective parallel axes. In this exemplary embodiment, these members are directly attached to the auxiliary shaft 24 and to the driving shaft 45 for rotation about the axes X—X and Y—Y, respectively. Alternatively, they could be coupled indirectly to the auxiliary throttle and/or directly to the motor shaft, which could itself serve as the driving shaft, or in any other way which achieves the objects of the invention.

Figure 4C:
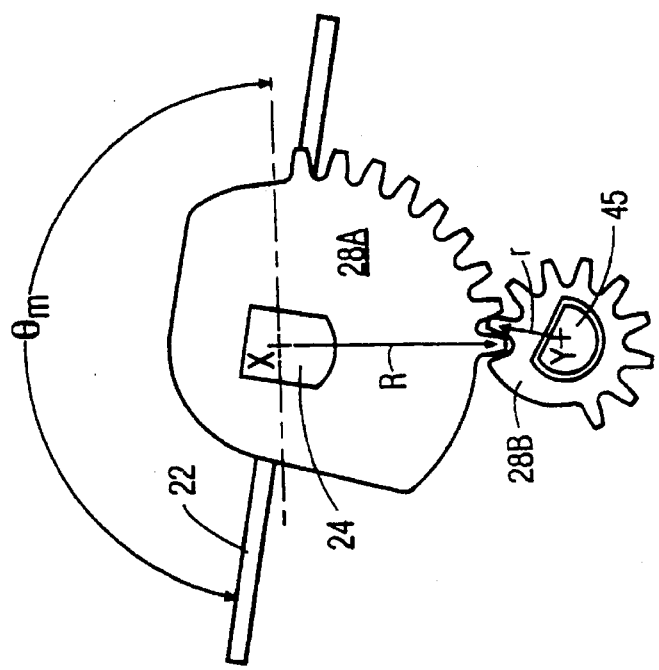
FIGS. 4A, 4B, and 4C show sequential positions of engaging parts of the first embodiment of a throttle control apparatus in accordance with the invention.
Figure 4B:
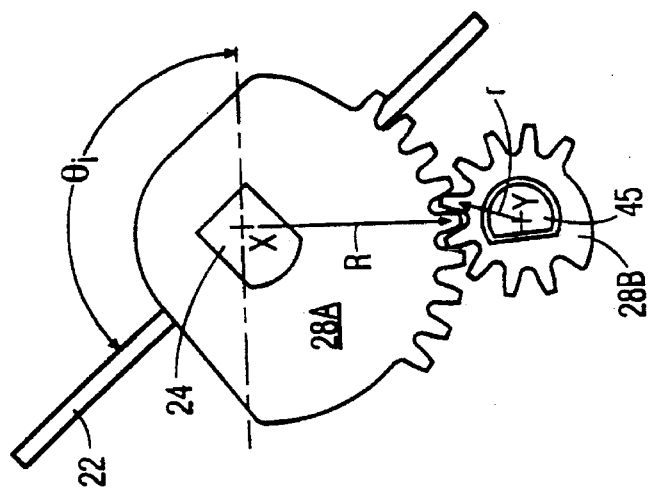
Figure 4A:
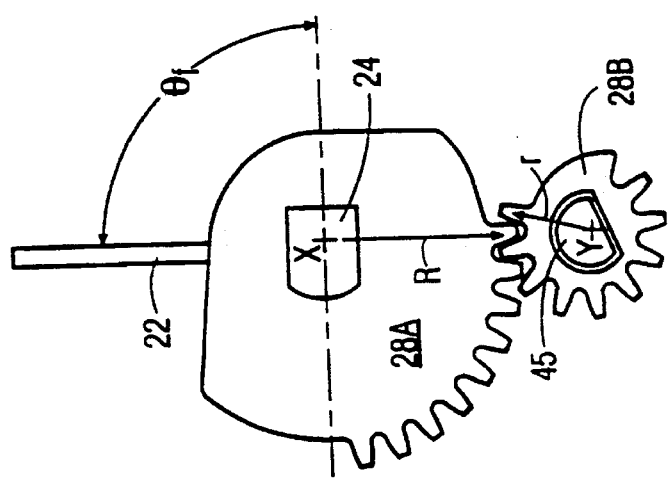

FIGS. 4A, 4B, and 4C illustrate, in sequential operating positions, an exemplary embodiment of the engaged variable-radius members 28A and 28B as viewed along the line IV—IV in FIG. 3. In this embodiment, gears of the type commonly known as scroll gears are utilized. It is apparent from these sequential operating positions that the effective radii R and r of the two gears (each measured from the respective shaft axis to point of gear tooth engagement) vary with angular position.

In particular, as the shaft 45 drives the throttle plate 22 (affixed to shaft 24) from the fail-safe position $\theta_f$ to the maximum operating position $\theta_m$, the effective radius R of the gear 28A increases while the effective radius r of the gear 28B decreases. Thus, the torque transferred to the shaft 24 (and against the counteracting torque of spring 26) increases with the increasing torque produced by the spring. By choosing the variation of the ratio of R to r to match the variation of the force developed by the spring with throttle position, a constant driving torque, smaller than $L_m$, (e.g. the intermediate torque $L_i$ shown in FIG. 2) will overcome the increasing torque produced by the spring.

In the event of a loss of electrical power to the motor 42, the torsion spring 26 must be capable of driving the auxiliary throttle plate 22 back to the fail-safe position $\theta_f$. To do this, the spring must apply sufficient torque to the shaft 24 to overcome all of: air force flowing in the throttle body and acting against the plate 22, a magnetic latching force produced by the stepping motor (even in its unpowered state) and all frictional forces in the auxiliary throttle plate driving arrangement. These include frictional forces where the shaft 24 is rotatably mounted in the throttle body 30, where the shaft 45 is rotatably mounted (e.g. through a wall of the housing 41), and where the gear members 28A–28B and 43A–43B contact each other. The spring 26 must overcome these forces despite a decreasing force developed by the spring (represented by the dashed line in FIG. 2) as it returns the auxiliary throttle plate from the maximum operating position $\theta_m$ to the fail-safe position $\theta_f$.

Referring to FIGS. 4C–4A, in that order, it can be seen how this is facilitated by giving the spring 26 an increasing advantage as it returns the throttle plate 22 to the fail-safe position. Specifically, as the spring 26 returns the throttle plate 22 from the maximum operating position $\theta_m$ to the fail-safe position $\theta_f$, the effective radius R of the gear 28A decreases while the effective radius r of the gear 28B increases. Thus, as the return force developed by the spring 26 decreases, the mechanical advantage provided to the spring by this arrangement of variable-radius gear members increases.

Another effect of the variable-gear-ratio arrangement, which is evident from the sequence shown in FIGS. 4A–4C, is a changing resolution of throttle plate control, which also varies with the ratio of the effective radii R and r. Specifically, as the throttle plate is driven toward its maximum operating position $\theta_m$, the angular change in its position for each degree of rotation of the driving shaft 45 decreases. This is particularly advantageous in a traction control application where initial closing (increasing angle $\theta$) of a throttle during a lost traction situation should be rapid and substantial, while finer control of further throttle closing is desirable.

In an exemplary version of the auxiliary throttle control arrangement shown in FIGS. 3 and 4A–4C:

the motor 42 was a type L82801 from Philips Technologies;

the gear ratios of the gears 43A and 43B was 4⅙:1;

the radius R of scroll gear 28A varied from 0.744 inch to 0,642 inch, while the radius r of scroll gear 28B varied from 0.303 inch to 0.200 inch over a range of auxiliary throttle angles from $\theta_f=90°$ to $\theta_m=170$; and the torsion spring 26 produced approximate return forces of $L_f=33$ in.-oz., $L_m=57$ in.-oz., and $L_i=45$ in.-oz.

FIG. 4C also reveals another feature of the variable-torque-ratio gear arrangement 28 which enables the radii r and R to be minimized, where limited space is available to accommodate the arrangement. The end of shaft 45 and a corresponding opening in gear 28B, into which this shaft end is fitted, are shaped to have varying radii with respective minimum values at approximately the same angular location as the radius r is at a minimum. In the illustrated embodiment, the end of shaft 45 and the opening in gear 28B are D-shaped, and the flat portion of the D is positioned at the location where r is a minimum. This both increases the minimum thickness of the gear body (measured between the opening and the gear periphery) and provides a shape which prevents rotary slippage of the gear 28B relative to the shaft 45. Less importantly, a similar shaping is used for the shaft 24 and the corresponding opening in gear 28A, with a flat surface positioned at the minimum value of R (FIG. 4A).

Figure 5:
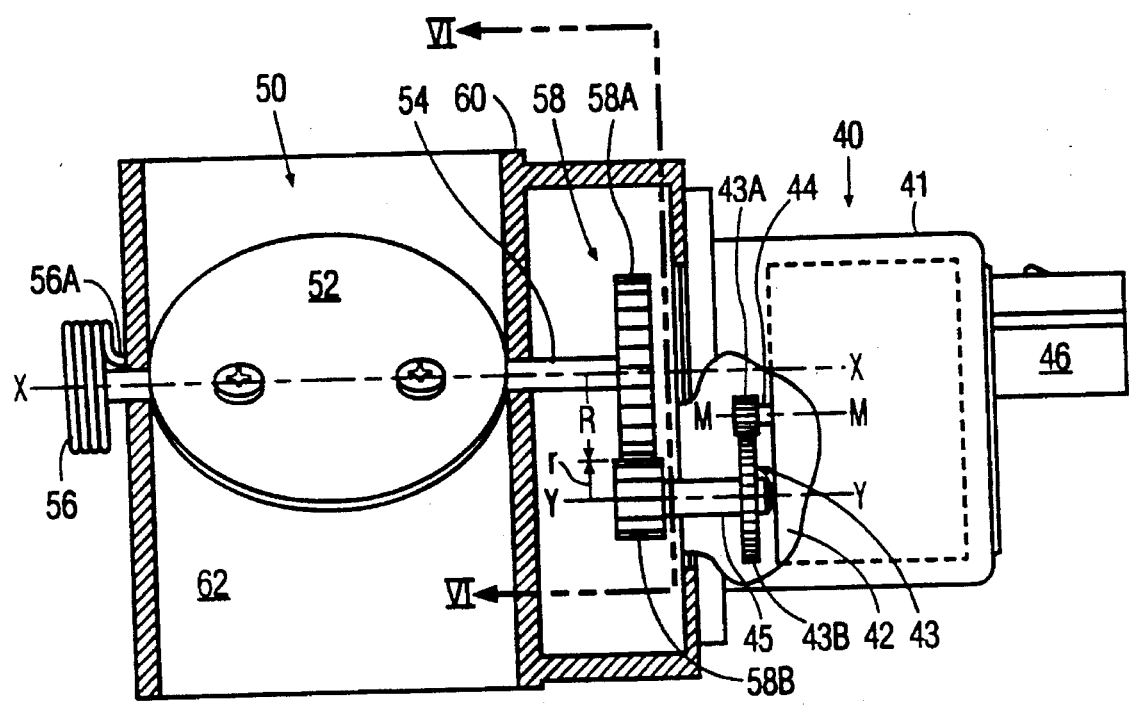
FIG. 5 is a front view, partly in cross section, of a second embodiment of a throttle control apparatus in accordance with the invention.

FIG. 5 illustrates a second embodiment of a throttle control apparatus in accordance with the invention. The apparatus comprises a single main throttle 50 including a throttle plate 52 which is rotatably mounted in a throttle body 60. A drive apparatus 40, which is substantially identical to that of FIG. 3, is attached to the throttle body.

In this exemplary embodiment, the single throttle operates as part of an engine control system in which engine control electronics (not shown) applies electrical pulses to the motor 42, via the connector 46, to position the throttle plate in response to a variety of conditions. These may include, for example, engine power signals from an operator and traction control signals received from wheel slippage sensors of a land vehicle.

Similarly to the first embodiment, the throttle control apparatus of FIG. 5 includes a shaft 54, to which throttle plate 52 is affixed, and which is mounted through openings in walls of the throttle body for rotation about axis X—X. A torsion spring 56 is disposed at one end of the shaft and has one end 56A attached to the throttle body and an opposite, internal end (not visible) attached to the shaft. The opposite end of the shaft 54 is coupled through a variable-torque-ratio arrangement 58 to the driving shaft 45 of the drive apparatus 40. In this embodiment, the torsion spring 56A biases the throttle plate 52 toward a fully-closed fail-safe position.

Figure 6C:
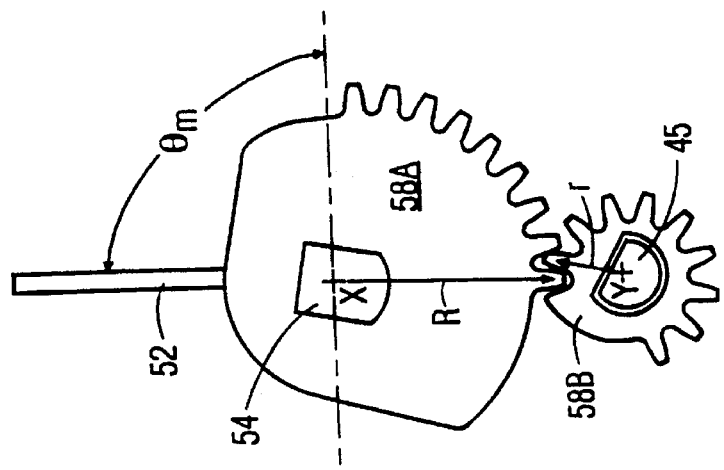
FIGS. 6A, 6B, and 6C show sequential positions of engaging parts of the second embodiment of a throttle control apparatus in accordance with the invention.
Figure 6B:
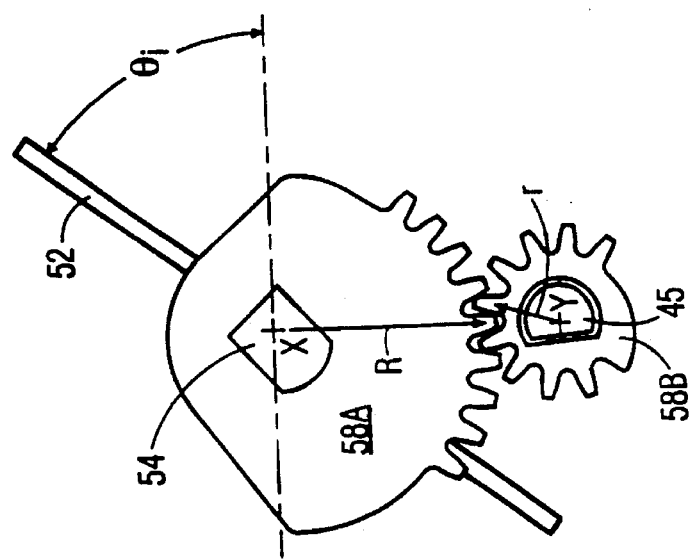
Figure 6A:
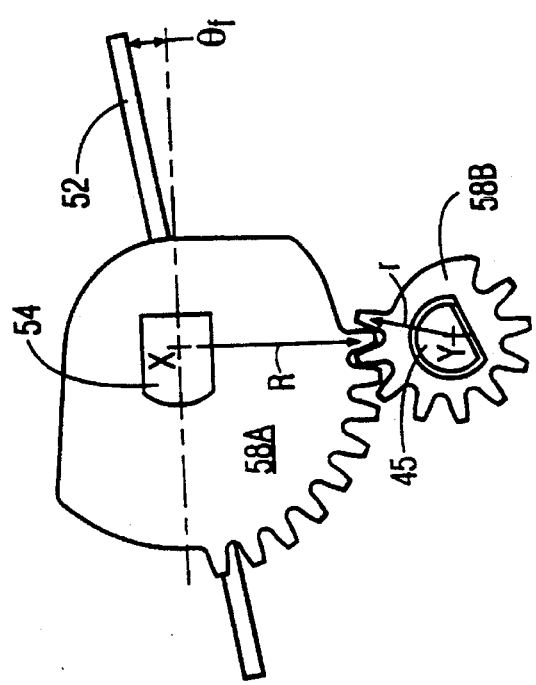

FIGS. 6A, 6B, and 6C illustrate sequential operating positions of the variable-torque-ratio arrangement 58, as viewed along the line VI—VI in FIG. 5. This arrangement is similar to that of FIG. 3, but the throttle plate 52 is oriented differently, because of the need for a closed (rather than open) fail-safe position. Also, the dimensions of the gears 58A and 58B, the ratios of the radii R and r, and the angular magnitudes of the geared sectors of these gears will be adapted to the particular engine and engine control electronics with which they are used.

FIGS. 6A through 6C illustrate the operation of the single-throttle control apparatus as the shaft 45 drives the throttle plate 52 from the fail-safe (minimum-engine-power) position (e.g. $\theta_f=10°$) to the maximum operating (maximum-engine-power) position (e.g. $\theta_m=90°$). Similarly to the operation of the first embodiment (FIGS. 4A–4C), the effective radius R of the gear 58A increases while the effective radius r of the gear 58B decreases. Thus, as in the first embodiment, the torque transferred to the shaft 54 (and against the counteracting torque of the spring 56) increases with the increasing torque produced by the spring. Again, by choosing the variation of the ratio of R to r to match the variation of the return force developed by the spring with throttle position, a constant driving torque, smaller than $L_m$, (e.g. $L_i$) will overcome the increasing torque produced by the spring.

By referring to FIGS. 6C–6A, in that order, it can be seen that the single-throttle control apparatus operates similarly to the first embodiment, and with the same advantages, as the spring 56 returns the throttle plate 52 to the fail-safe position.

I claim:

1. A control apparatus for positioning a throttle of an engine in response to a control signal, said apparatus comprising:

a. a throttle member rotatable about a first axis between a fail-safe position and a maximum-operating position for effecting respective first and second power outputs from the engine;

b. spring means operatively connected to the throttle member to force said member toward the fail-safe position;

c. electrically-controllable drive means having a motive shaft which is rotatable about a second axis and having an electrical input for receiving the control signal;

d. variable torque ratio means coupling the motive shaft to the throttle member, said means effecting an increasing ratio of return torque exerted by the spring means to return torque transferred thereby to the motive shaft as the throttle member moves from the fail-safe position toward the maximum operating position.

2. A control apparatus as in claim 1 where the throttle member comprises a throttle plate attached to a throttle shaft which is rotatable about the first axis.

3. A control apparatus as in claim 2 where the spring means comprises a torsion spring disposed about and attached to the throttle shaft.

4. A control apparatus as in claim 1 where the spring means produces a force which increases with said movement of the throttle member from the fail-safe position to the maximum operating position.

5. A control apparatus as in claim 1 where the electrically-controllable drive means comprises an electric motor which is adapted for changing the position of the motive shaft in response to said control signal.

6. A control apparatus as in claim 5 where the electric motor comprises a stepper motor and where the control signal comprises electrical pulses for stepping the motor to different discrete positions.

7. A control apparatus as in claim 5 where the electrically-controllable drive means comprises engaging gear means coupling a rotatable shaft of the electric motor to the motive shaft.

8. A control apparatus as in claim 1, 2, 4 or 5 where said apparatus comprises a traction control apparatus and where the throttle member comprises an auxiliary throttle.

9. A control apparatus as in claim 1, 2, 4 or 5 where the throttle member comprises a main throttle.

10. A control apparatus for positioning a throttle of an engine in response to a control signal, said apparatus comprising:
   a. a throttle member rotatable about a first axis between a first position and a second position for effecting respective first and second power outputs from the engine;
   b. spring means coupled to the throttle member for exerting a force for forcing said throttle member toward the first position, said force varying with the position of said throttle member;
   c. electrically-controllable drive means having a driving shaft adapted for rotation about a second axis in response to the control signal;
   d. first and second variable-radius members, rotatable about respective first and second parallel axes, said variable-radius members being coupled to the throttle member and to the driving shaft, respectively, being mutually engaged, and having respective radii for effecting an increasing ratio of return torque exerted by the spring return means to return torque transferred thereby to the driving shaft as the throttle member moves from the first position to the second position.

11. A control apparatus as in claim 10 where the throttle member comprises a throttle plate attached to a throttle shaft which is rotatable about the first axis.

12. A control apparatus as in claim 11 where the spring means comprises a torsion spring disposed about and attached to the throttle shaft.

13. A control apparatus as in claim 10 where the spring means exerts a force which increases with said movement of the throttle member from the first position to the second position.

14. A control apparatus as in claim 10 where the electrically-controllable drive means comprises an electric motor which is adapted for changing the position of the driving shaft in response to said control signal.

15. A control apparatus as in claim 14 where the electric motor comprises a stepper motor and where the control signal comprises electrical pulses for stepping the motor to different discrete positions.

16. A control apparatus as in claim 14 where the electrically-controllable drive means comprises engaging gear means coupling a rotatable shaft of the electric motor to the driving shaft.

17. A control apparatus as in claim 10 where the first and second variable-radius members are affixed to the throttle member and to the driving shaft, respectively.

18. A control apparatus as in claim 10, 11, 13, 14 or 17 where said apparatus comprises a traction control apparatus and where the throttle member comprises an auxiliary throttle.

19. A control apparatus as in claim 10, 11, 13, 14 or 17 where the throttle member comprises a main throttle.

* * * * *